United States Patent
Hanson et al.

(10) Patent No.: US 6,322,740 B1
(45) Date of Patent: Nov. 27, 2001

(54) PROCESS AND APPARATUS FOR CREATING ARTIFICIAL LEAVES AND FLOWERS

(75) Inventors: Susan Hanson, Long Beach; Andrew Glanz, Merrick, both of NY (US)

(73) Assignee: Natural Science Industries, Ltd., West Hempstead, NY (US)

( * ) Notice: Subject to any disclaimer, the term of this patent is extended or adjusted under 35 U.S.C. 154(b) by 0 days.

(21) Appl. No.: 09/666,903

(22) Filed: Sep. 20, 2000

Related U.S. Application Data

(60) Division of application No. 09/064,295, filed on Apr. 22, 1998, now abandoned, which is a continuation-in-part of application No. 08/958,013, filed on Oct. 27, 1997, now Pat. No. 5,935,503.

(51) Int. Cl.[7] .................................................. B29C 39/10
(52) U.S. Cl. ............................. 264/275; 249/55; 249/96; 264/279; 425/2; 425/112; 425/470
(58) Field of Search ................................. 249/55, 96, 97, 249/117, 134; 264/279, 275; 206/575; 425/2, 112, 470

(56) References Cited

U.S. PATENT DOCUMENTS

| | | | | |
|---|---|---|---|---|
| 2,467,565 | * | 4/1949 | Owens et al. ........................ | 156/267 |
| 2,684,503 | * | 7/1954 | Silver ....................................... | 249/55 |
| 2,697,892 | * | 12/1954 | Haas ........................................ | 41/13 |
| 2,793,454 | * | 5/1957 | Shoemaker ............................. | 41/10 |
| 2,901,852 | * | 9/1959 | Hall ......................................... | 41/13 |
| 2,908,942 | * | 10/1959 | Bosco . | |
| 3,146,153 | * | 8/1964 | Stein . | |
| 3,947,992 | * | 4/1976 | Lemelson ............................... | 46/17 |
| 4,293,997 | * | 10/1981 | Lee ......................................... | 29/450 |
| 4,407,766 | * | 10/1983 | Haardt et al. ........................ | 249/117 |
| 4,409,768 | * | 10/1983 | Boden ..................................... | 52/747 |
| 5,580,507 | * | 12/1996 | Williamson et al. ................ | 249/112 |
| 5,935,503 | * | 8/1999 | Hanson ................................. | 264/275 |

FOREIGN PATENT DOCUMENTS

| | | | |
|---|---|---|---|
| 2272616 | * | 12/1975 | (FR) . |
| 720688 A | | 12/1954 | (GB) . |
| 852743 A | | 11/1960 | (GB) . |
| 1423121 A | | 1/1976 | (GB) . |
| 174621 | * | 4/1935 | (SE) . |

OTHER PUBLICATIONS

Patent Abstract JP of Japanese reference 59–216909 dated Dec. 1984.

Patent Abstract of Japanese reference 6–99699 dated Apr. 1994.

\* cited by examiner

*Primary Examiner*—Robert Davis
(74) *Attorney, Agent, or Firm*—Schweitzer Cornman Gross & Bondell LLP

(57) ABSTRACT

A method and apparatus for the forming of artificial leaves and flower petals, especially for use as a craft item, includes a male form for forming an armature for the leaf or petal and a female mold for generating the leaf or petal body. A flexible wire is wrapped about the male form to form an armature with an extending stem. The armature is removed from the form and placed in the mold. The mold is then filled with a film-forming casting material, such as a polyvinyl acetate. Upon cure, the artificial leaf or petal is removed from the mold. The leaf or petal may be combined with other leaves or petals similarly formed to form an artificial floral arrangement.

14 Claims, 5 Drawing Sheets

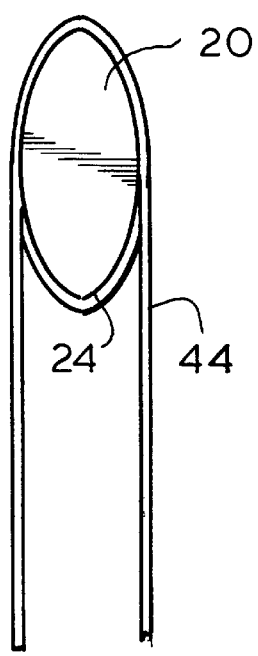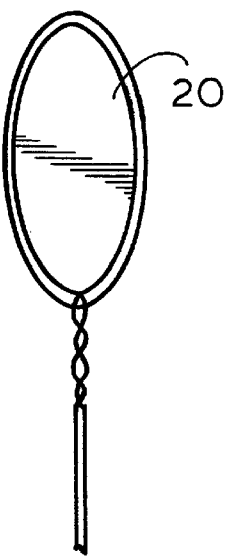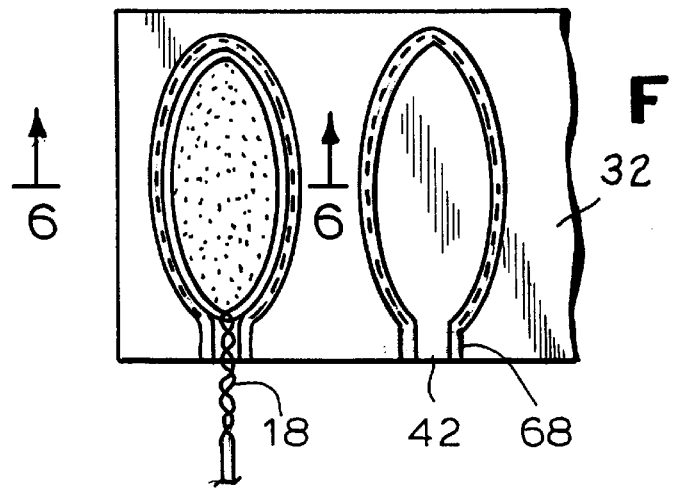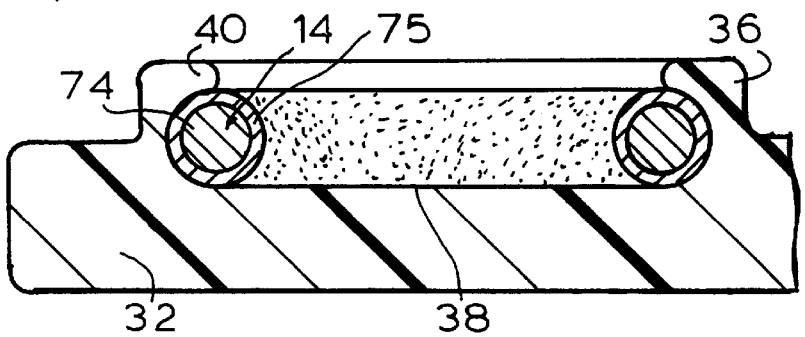

FIG. 7a
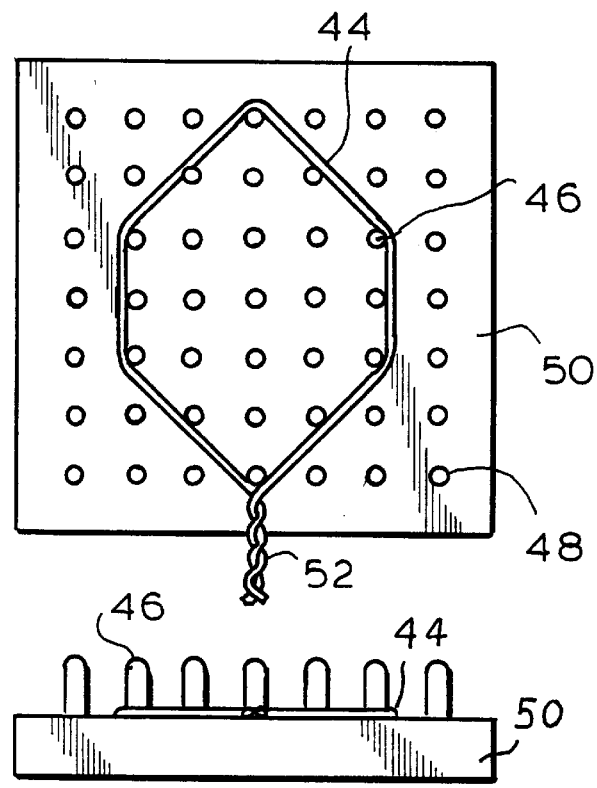
FIG. 7b
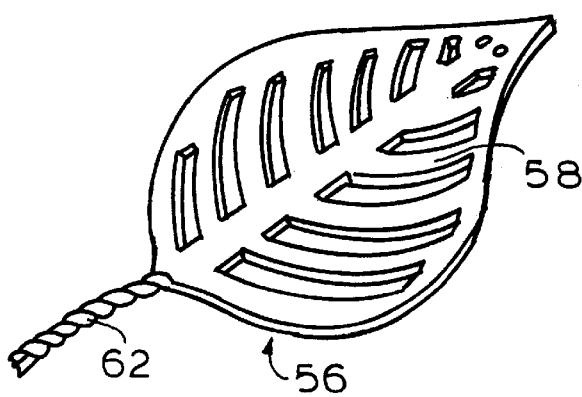
FIG. 8

PROCESS AND APPARATUS FOR CREATING ARTIFICIAL LEAVES AND FLOWERS

The present application is a divisional of application Ser. No. 09/064,295, filed Apr. 22, 1998 and now abandoned, which is a continuation-in-part of application Ser. No. 08/958,013, filed Oct. 27, 1997, now U.S. Pat. No. 5,935,503.

The present invention relates to a new and improved process and apparatus, particularly suited for children's crafts, for the creation of artificial petals, leaves and other objects which may be subsequently assembled to create attractive and long-lasting artificial floral-type arrangements, as well as novelty items.

BACKGROUND OF THE INVENTION

The creation of artificial flowers and leaves is well known. The prior art teaches, for example, the pressing of individual leaves and petals from sheet-like material, which petals and leaves are subsequently interconnected and joined as desired. It is also known to utilize a wire-like armature to provide the appearance of a vein within a leaf and to provide a stem-like armature. Various materials and compounds, including liquid plastic formulations, have been utilized for molding. Often, however, such compounds are flammable and/or hazardous, thus limiting their use, particularly for craft or hobby sets intended for home use.

It is accordingly a purpose of the present invention to provide a method and apparatus for the creation of artificial petals and leaves which utilizes non-hazardous or flammable materials.

Yet another purpose of the present invention is to provide such a method and apparatus which is of simple, yet efficient means.

Still another purpose of the present invention is to provide an apparatus for carrying out the aforementioned purposes which is of simple, yet resilient construction.

A still further purpose of the present invention is to provide an apparatus of the foregoing type which can be presented in the form of a kit.

BRIEF DESCRIPTION OF THE INVENTION

In accordance with the foregoing and other objects and purposes, the method of the present invention comprises the formation of a frame constituting the intended exterior shape of the leaf or petal to be modeled. In one embodiment, the frame is created by wrapping a flexible yet rigid material about a male form corresponding to the desired outline shape. The frame element is then removed from the form and placed upon a mold surface. The mold surface may preferably be in the form of a female mold similarly corresponding to the desired shape. The female mold retains the frame element therein. A liquid casting substance is then placed in the mold. The casting material sets to a thick film, adhering to the frame material. When set, the thus produced artificial petal or leaf element is removed. The casting material is a non-toxic water soluble formulation, able to be tinted or colored. Polyvinyl acetate is preferred.

The apparatus by which the process of the present invention may be carried out may include one or more male forms of various peripheral contours, constituting a desired leaf, petal or other shape, as well as one or more corresponding female molds to accept the corresponding frame. Casting material in a plurality of colors may be provided to give variety to the cast designs. Glitter may be mixed into the casting material.

The armature may be constructed to include both the desired outline as well as a matrix of internal elements, subdividing the interior of the frame into smaller areas or cells. The interior cells may be formed by interconnecting flexible elements after the peripheral frame is constructed. Alternatively, the frame may be punched from a sheet.

BRIEF DESCRIPTION OF THE DRAWINGS

A fuller understanding of the present invention and the objects and features thereof will be obtained upon consideration of the following detailed description of preferred, but nonetheless illustrative embodiments of the present invention, when considered in association with the annexed drawings, wherein:

FIG. 3 is a top plan view of a male mold with a frame member placed thereon;

FIG. 4 is a top plan view of a male mold with the frame member wrapped therearound;

FIG. 5 is a top plan view of the female molds of FIG. 2, illustrating the casting step;

FIG. 6 is a section view taken along line 6—6 of FIG. 5;

FIGS. 7a and 7b are top plan and elevation views, respectively, of an alternate embodiment for a male mold;

FIG. 8 is an illustration of an armature formed from a sheet-like material;

DETAILED DESCRIPTION OF THE INVENTION

Figure 1:
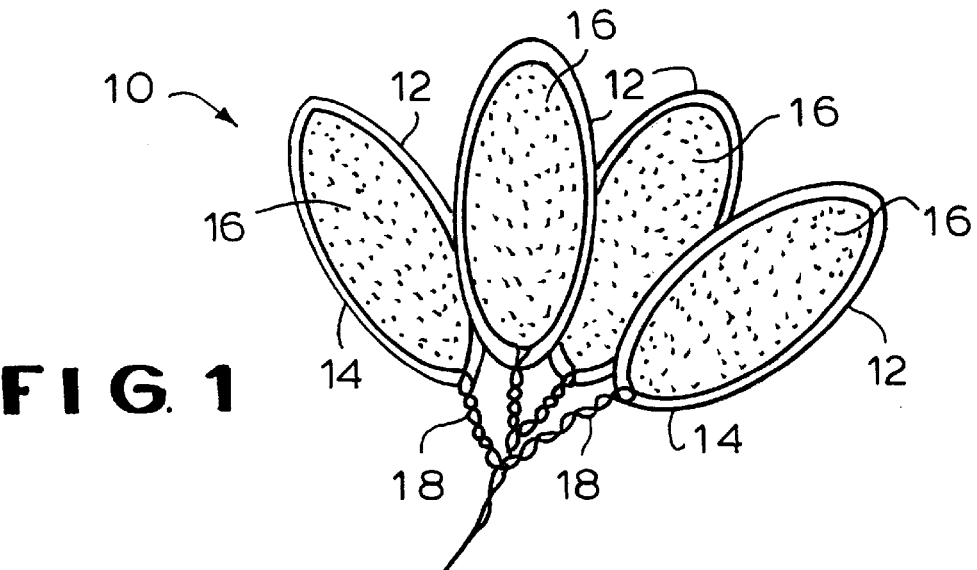
FIG. 1 is an illustration of an arrangement created in accordance with the present invention.

As depicted in the figures, the present invention provides a method and apparatus for creating artificial floral-type products, such as leaf arrangement 10, as well as other craft items comprising a peripheral frame filled with a film-like material. By way of example, arrangement 10 comprises a plurality of individual petals or leaves 12, each of which has a peripheral frame or armature 14 supporting a film-like leaf body 16. Each of the armatures 14 include a stem portion 18, the stem portions being able to be joined together, such as by twisting to join the individual petals or leaves together into an attractive, life-like arrangement as desired by the user. As an alternative, however, the individual leaves 12 may be in the shape of, for example, butterfly wings or portions thereof, whereby they may be combined to form a butterfly-type creation. In general, the shape formed by the frame or armature may preferably include an exterior stalk or stem to allow the completed item to be supported from a stand or combined with other items.

Figure 2:
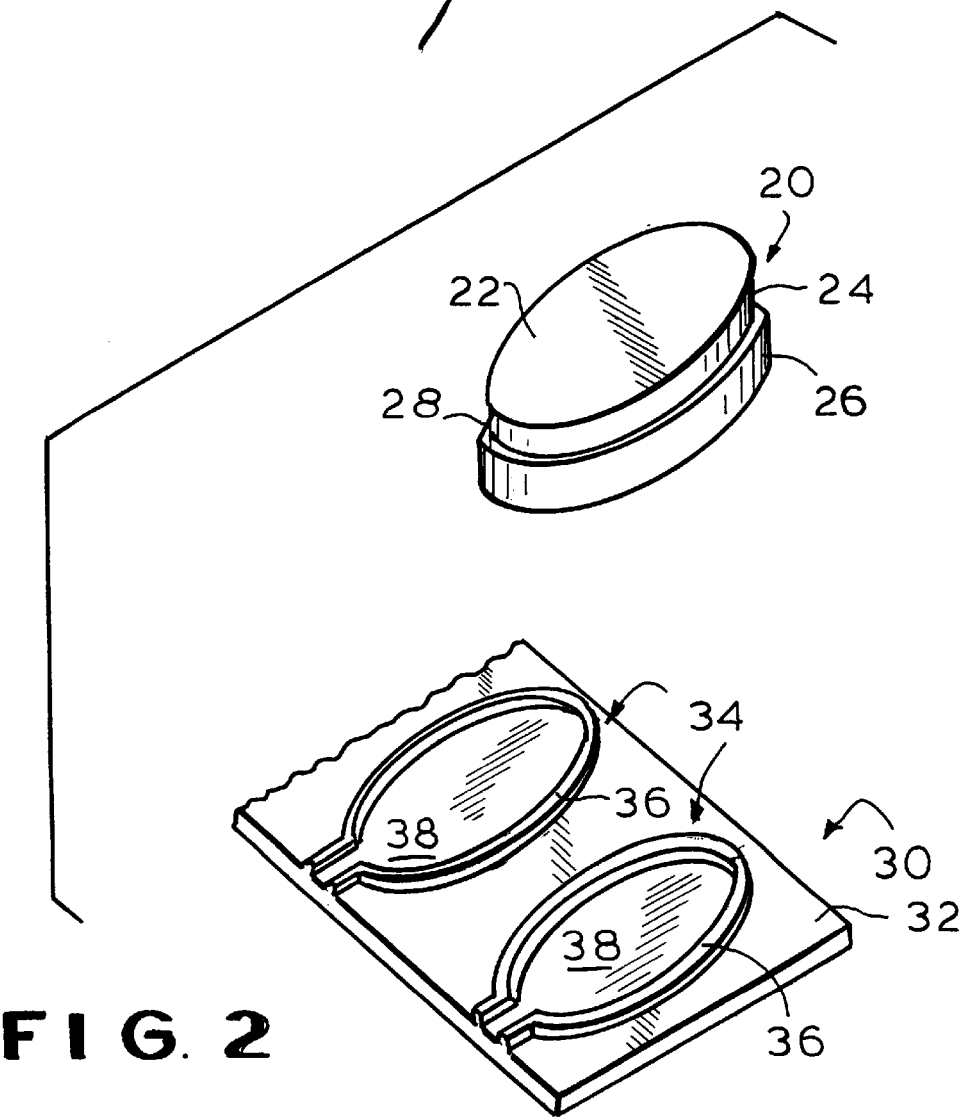
FIG. 2 is a perspective view of a male mold or form and a pair of female molds.

Each of the leaves 12 may be formed by the wrapping of a length of armature material, which may be thin gauge wire, either coated or uncoated, about a male form, the gauge of the wire is chosen to be easily wrapped about the form but with sufficient rigidity to retain the desired shape of a leaf or petal. As depicted in FIG. 2, the male form 20 includes an upper portion 22 having a vertical side wall 24 in the desired outline shape for the petal or leaf armature to be formed thereon. Base portion 26 includes top horizontal wall 28 which, with side wall 24, forms a shoulder construction against which the armature wire may be wrapped and twisted, the armature wire conforming closely to the contour of the side wall 24.

As depicted in FIGS. 3 and 4, a chosen length of wire 44 is placed against the side wall 24 and wrapped fully about the form. The free ends of the wire are then twisted together as shown in FIG. 4, drawing the wire snugly about the form and allowing the wire to assume the shape of the form. The formed creation is then slid upwardly along the side wall whereby it is removed from the form.

A variety of alternative types of forms may be used. As depicted in FIG. 7, the form may comprise a series of headless pegs 46 which are arrayed in a matrix of holes 48 in base 50. The pegs are arrayed as desired to form the outline desired. A wire is then wrapped around the pegs and its ends twisted together at 52. The armature is then removed from the form.

Figure 9:
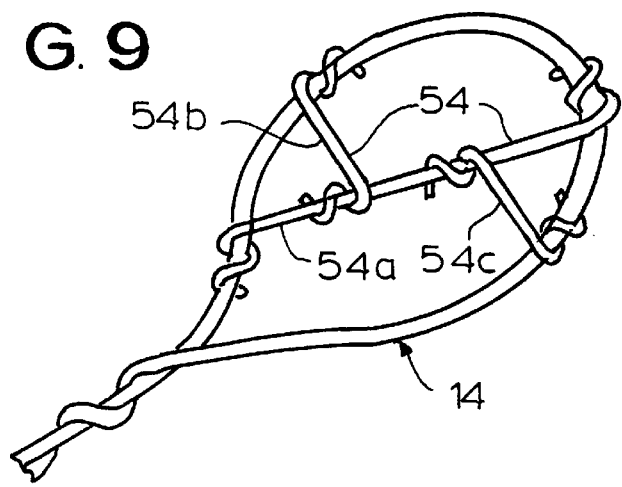
FIG. 9 is an illustration of a leaf-like armature having interior network.

The armature may be formed with an interior network to subdivide the leaf or petal into smaller sections or cells. As depicted in FIG. 9, after the armature 14 is formed a plurality of inner crossing members 54 may be applied. A first crossing member 54a may extend between opposite sides of the armature, for example, with intermediate members 54b and 54c extending between the member 54a and the armature. Each of the members 54 may be of wire, the ends of the wire sections being wrapped about the element to which it is connected.

As shown in FIG. 8, the armature may alternatively be in the form of a mesh-like element 56, formed from a plastic sheet material. The outline of the desired object, such as a leaf or petal, is punched or cut from a blank of the material, with the inner vein-like network 58 forming apertures 60 being similarly punched or cut. The plastic may preferably be of a thickness of about ⅟16 inch. The armature may either include an integral tail or stem 62 or have means to allow fastening of a wire or similar tail-forming element thereto.

Figure 12:
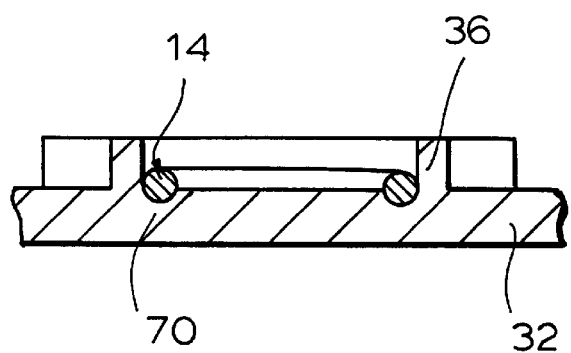
FIG. 12 is an illustration of an alternate female mold.

A female mold is depicted in FIGS. 2, 5 and 6. As shown therein, female mold unit 30 may comprise an elongated base 32 having a plurality of individual molds 34 thereon. The molds may be of identical or different shapes, allowing a plurality of petals, leaves or other desired shapes to be formed. Each of the individual molds has a side wall 36 extending upwardly from and about mold bottom 38. The upper portion of the side wall 36 may terminate within a slightly in-turned lip portion 40. The mold wall may include parallel wall portions 68 to assist in supporting the "stem" portion of the design. Each of the individual molds is provided with a side opening 42 between the portions 68 through which the stem 18 of the armature, extending beyond the leaf or petal outline, projects and is supported. The parallel wall portions may be deleted. In addition, as seen in FIG. 12, a small depression 70 may be formed in the base 32 about the inner periphery of the mold wall 36 to further support the armature, particularly if an inner network is not present. The depression 70 may be used either with or without the lip portion 40 as seen in FIG. 6.

Each of the individual molds 34 corresponds in shape to a male form 20, and particularly to the shape of an armature 14 as generated by the male form. The armature is placed within a corresponding mold, as depicted in FIGS. 5 and 6, the armature fitting closely against the inner surface of mold side wall 36, and being gently retained within the mold by the in-turned lip 40 and/or by the depression 70.

Figure 10:
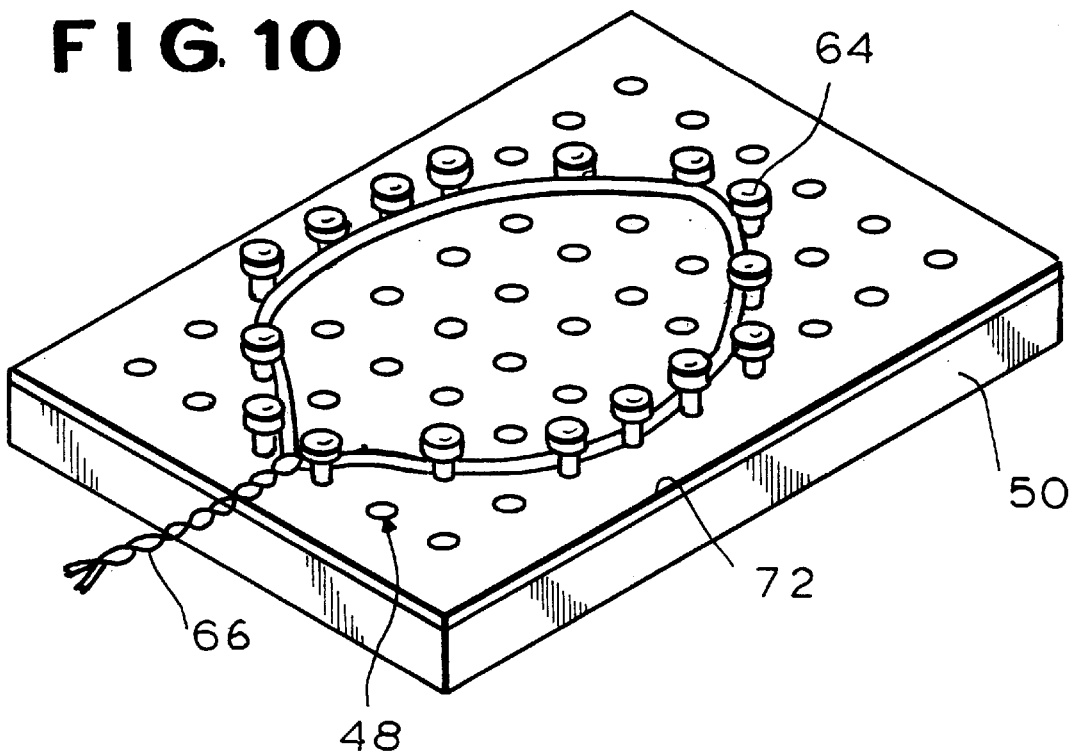
FIG. 10 is an illustration of an alternative female mold configuration.
Figure 11:
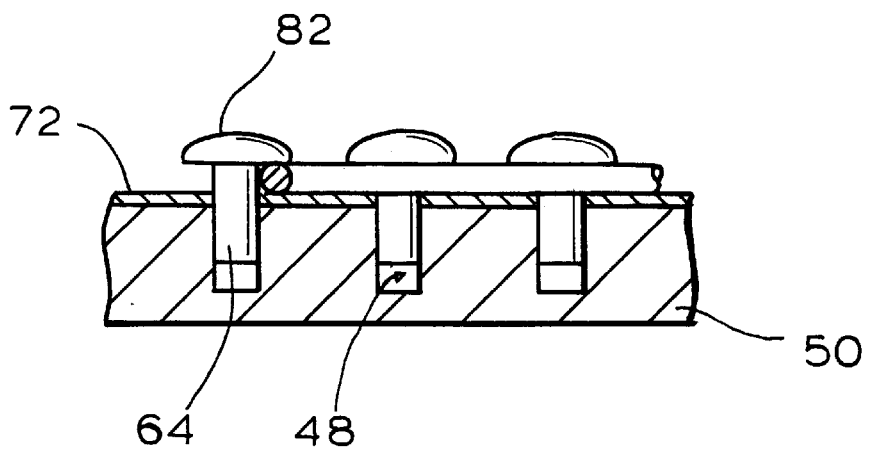
FIG. 11 is a detailed view of a portion of the construction of FIG. 10.

As with the forming of the armature, a variety of mold types can be utilized. As shown in FIGS. 10 and 11, an adjustable type mold utilizing pegs placed in a base in a manner analogous to the male form of FIG. 7 can be employed. In this embodiment the pegs 64 have heads 64, and are similarly arrayed in a base 50 having a matrix of hole 48. For use as a mold, however, the formed armature 66 is supported in place by the pegs 62 arrayed to the exterior of the armature, so as to not interfere with the filling thereof. The heads of the pegs, which have a friction fit into the base, hold the armature snugly against the base, as seen in FIG. 11. As also depicted therein, a removable layer 72 of a release substance, such as wax paper, is placed on top of the base. The release layer covers the unused holes in the base, which are within the outline of the armature and facilitate removal of the formed item from the mold. The use of a thin film-like layer also allows the pegs 62 to easily puncture the film for insertion as desired. If utilized in connection with the male form of FIG. 7, the position of the bores in the two bases may be coordinated or offset from each other in a manner which assures compatibility between the units.

In a further modification of this embodiment, the mold of FIGS. 10 and 11 may be utilized both as an armature-forming structure as well as a female mold. The pegs are arrayed as desired, and the armature-forming wire is bent to conform to the periphery formed by the inner portions of the peg shanks. Once the wire is placed as desired the created armature can be removed for the addition of inner elements, as shown in FIG. 9, and the replaced in the mold, or simply left without such addition. The armature is then is filled with the film-forming material.

With an armature placed in the appropriate individual mold, a liquid molding material is placed in the mold to form the leaf or petal body. The liquid may preferably be, for example, a nontoxic polyvinyl acetate, which may be colored with an appropriate colorant as known in the art. Typically, such a liquid is highly viscous, and may be applied within the mold by use of a brush. The use of a brush is preferred, as it allows a controlled layer of the liquid material to be built up upon and across the entire mold bottom surface and in contact with the entire periphery of the item-forming armature. As shown in FIG. 6, the layer is preferably of a height substantially the same as the height of the armature 14 which is shown as comprising copper wire 74 within an insulating coating 76. Use of insulated, as opposed to bare, wire may be preferred since it allows an increased overall diameter for the wire element at lower cost than an uncoated/uninsulated wire of the same diameter. Due to the viscous nature of polyvinyl acetate, it is possible to apply a plurality of differently-colored molded materials in differing areas of the mold without significant flow-out and thus mixing of the colors. Glitter may also be incorporated into the polyvinyl acetate material to provide varying effects. In this way multi-colored leaf and petal designs can be created. Polyvinyl acetate is particularly preferred in that it is water soluble when liquid and is generally considered non-hazardous. When a partitioned armature is utilized, such as depicted in FIGS. 8 or 9, each of the cells may be filled with a different color to add to the appeal and interest of the design.

The female mold of FIGS. 2, 5 and 6 is preferably formed of a material, such as polyethylene, to which the polyvinyl acetate does not bond. Thus, when dry the produced item may be easily removed from the mold by lifting the armature from the mold. In the embodiment of FIGS. 10 and 11 the layer 72 serves this purpose. The polyvinyl acetate adheres to the armature as a leaf-forming film, easily peeling away from the mold surface, producing a well-formed leaf or petal and leaving the mold available for re-use. Both the armature and adhered leaf body 16 have sufficient flexibility to pass the side wall lip 40 or the heads of the pegs 62. Alternatively the pegs may be simply removed from the base to facilitate item removal.

Figure 13:
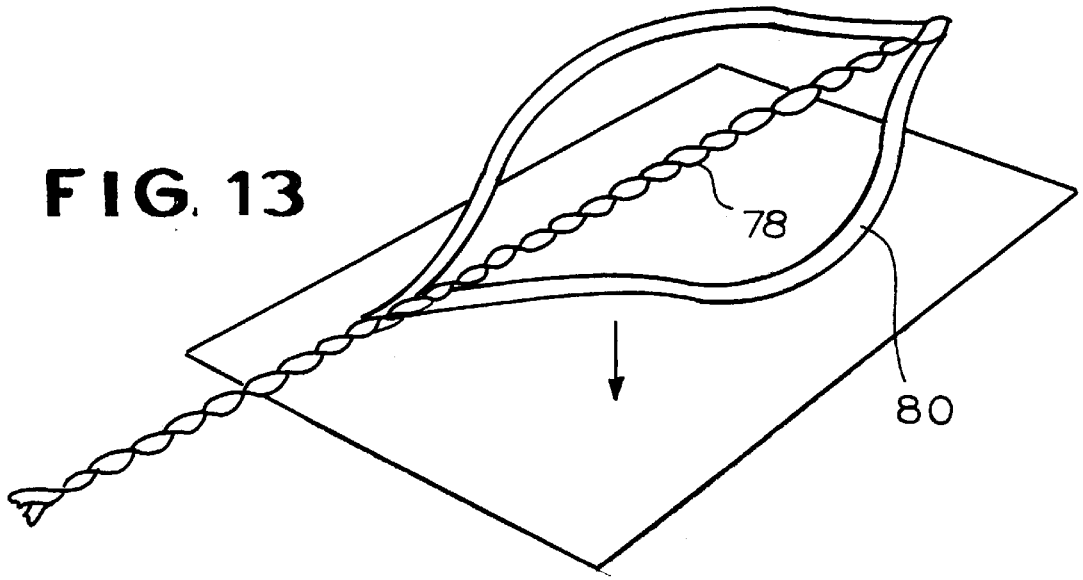
FIG. 13 is an illustration of a further alternate form for an armature construction.

In yet another embodiment of the invention, the side walls of the female forms may be dispensed with, the formed armatures being filled with the film-forming material in an alternate manner. For example, the armature may be placed on a mold surface to which the film-forming material does not adhere, the polyvinyl acetate being brushed or poured over the armature as desired. When dry the formed item is removed from the mold surface. If the cured film extends beyond the armature periphery it can be trimmed to shape with scissors. The armature can include a peripheral frame portion, 82 as seen in FIG. 13 as depicted in FIGS. 4 or 8, or may alternatively have just a central spine, in which case the completed item would normally be trimmed to the final desired shape. Still further, the mold surface may include an adhesive-covered area or portion to allow the armature to stay in a fixed position on the mold when the polyvinyl acetate is applied. Once the polyvinyl acetate cures, the formed item is peeled apart from the mold surface. The mold surface may preferably be in sheet form.

When the female mold does not incorporate a sidewall, other materials, beyond those which can maintain a chosen shape likewise, can be more easily utilized for an armature. For example, thin strips of cellophane or other film-like material may be affixed to a central spine as shown in FIG. 13 in which central spine 78, which may be of wire, is surrounded by film-like strips 80 which form a desired pattern, such as the outline of a leaf. The strips 80 may be affixed to the spine at their ends by wrapping wire segments, or other means. The strips may alternatively be combined with other armature-forming elements of greater rigidity, such as wire sections, similarly twisted or otherwise fastened to spine 78 as well as to themselves.

Because of the flexible nature of both the armature, particularly when formed of wire, and the filling material, a generated leaf, petal or other item may be further gently bent or formed from the original flat orientation as removed from a mold to a more-natural representation. When grouped together, the resulting artificial arrangements, which may include leaves and petals of varying shape and coloration, is particularly life-like and long-lasting.

The elements of the present invention may be advantageously packaged as a kit. Such a kit may include a plurality of male forms of a variety of shapes to create both leaf and petal shapes, and corresponding female molds. A plurality of identical female molds may be included to allow several identical armatures to be cast upon simultaneously. A set of molding compounds of a variety of colors, along with one or more brushes or other applicators, complete the kit, allowing a wide-variety of arrangements to be created.

One skilled in the art will readily perceive that the invention as set forth and described herein is not necessarily limited to the specific embodiments shown. For example, other forms of items, beyond leaves and petals, may be constructed pursuant to the invention.

We claim:

1. A method for forming a decorative item, comprising the steps of forming a side wall of a male form in a desired outline by placing a plurality of pegs in a matrix of holes in a base member, wrapping a length of flexible wire about the side wall of the male form to form a peripheral armature of the desired outline; removing said armature from the male form and inserting it into a female mold having a mold bottom adapted and arranged to support the armature; filling said mold to the level of said armature with a casting compound; allowing said casting compound to cure to a film-like consistency; and removing the decorative item from the mold.

2. An kit for forming decorative items, comprising: a length of flexible wire capable of being formed into a peripheral armature of a desired outline and retaining the desired outline upon forming; a male form comprising a base with a matrix of bores arrayed upon a top surface and a plurality of pegs located in selected ones of said bores, said pegs forming a side wall of a contour corresponding to the desired outline shape of the item to be formed, said wire being formed into said armature by wrapping about said side wall; a female mold having a mold bottom to accept the armature; and a casting compound for filling said mold within the periphery of the armature and curing to a film-like consistency.

3. The kit of claim 2, wherein said mold bottom includes an adhesive layer portion to removably adhere said mold bottom to said armature.

4. The apparatus of claim 3, wherein said mold is of polyethylene.

5. The kit of claim 2, wherein said casting compound is a polyvinyl acetate.

6. The kit of claim 2, wherein said wire is a coated wire, said casting compound being a polyvinyl acetate.

7. A method for forming an artificial leaf or petal, comprising the steps of wrapping a length of flexible wire about a side wall of a male form to form a peripheral leaf or petal-forming armature having an extending stem; removing said armature from the male form and inserting it into a female mold having a mold bottom adapted and arranged to support the armature; filling said mold to the level of said armature with a casting compound; allowing said casting compound to cure to a film-like consistency; and removing the artificial leaf or petal from the mold.

8. The method of claim 1, wherein said casting compound is a polyvinyl acetate.

9. The method of claim 1 comprising the further step of forming an open network of wires within the peripheral armature after removing the armature from the male form and prior to inserting the armature into the female mold.

10. The method of claim 7 further comprises an initial step of forming the side wall of the male form by placing a plurality of pegs in a matrix of holes in a base member.

11. The method of claim 10, wherein said step of wrapping the wire about the side wall comprises positioning the wire against inwardly-directed portions of the pegs.

12. The method of claim 1 further comprising the step of forming the female mold by placing a plurality of pegs in a matrix of holes in a base member.

13. The kit of claim 2 wherein the female mold comprises a base with a plurality of bores arrayed upon a top surface and a plurality of pegs located in selected ones of said bores, said pegs forming a side wall extending upwardly to form a chamber to accept the armature, the side wall of the mold being adapted and arranged to abut the armature.

14. The kit of claim 13, wherein retaining means comprise heads of the pegs.

* * * * *